(12) United States Patent
Nakase et al.

(10) Patent No.: US 12,517,543 B2
(45) Date of Patent: Jan. 6, 2026

(54) MULTI-DIRECTIONAL INPUT DETECTION APPARATUS

(71) Applicant: SHENZHEN ZESUM TECHNOLOGY CO., LTD., Shenzhen (CN)

(72) Inventors: Yusho Nakase, Shenzhen (CN); Wei Yang, Shenzhen (CN); Shiying Yang, Shenzhen (CN); Chaoxian Chen, Shenzhen (CN)

(73) Assignee: SHENZHEN ZESUM TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/792,299

(22) Filed: Aug. 1, 2024

(65) Prior Publication Data
US 2025/0355459 A1 Nov. 20, 2025

(30) Foreign Application Priority Data
May 20, 2024 (CN) .......................... 202421103908.0

(51) Int. Cl.
G05G 9/047 (2006.01)
H05K 1/18 (2006.01)

(52) U.S. Cl.
CPC .................................. *G05G 9/047* (2013.01)

(58) Field of Classification Search
None
See application file for complete search history.

(56) References Cited

U.S. PATENT DOCUMENTS

2019/0056759 A1* 2/2019 Wang ...................... G06F 3/038
2023/0324945 A1* 10/2023 Zeng ....................... G05G 9/047

* cited by examiner

Primary Examiner — Carl Adams
(74) Attorney, Agent, or Firm — Westbridge IP LLC (57) ABSTRACT

A multi-directional input detection apparatus includes: a seat; a housing provided above the seat, the housing being provided with an inner cavity and an opening communicated with the inner cavity; a circuit board provided between the housing and the seat, an induction pin being provided on a surface of the circuit board towards the opening; a rotating assembly provided in the inner cavity; and a rocker assembly including a rod body and a conductor. One end of the rod body is slidably connected to the rotating assembly, and the other end of the rod body is configured to extend to an outside of the opening; one end of the conductor is connected to a part of the rod body outside the opening and is exposed on an outer surface of the rod body, and the other end of the conductor is configured to extend into the inner cavity.

10 Claims, 6 Drawing Sheets

MULTI-DIRECTIONAL INPUT DETECTION APPARATUS

CROSS-REFERENCE TO RELATED APPLICATIONS

The present application claims priority to Chinese Patent Application No. 202421103908.0, filed on May 20, 2024, the entire contents of which are incorporated herein by reference.

TECHNICAL FIELD

The present application relates to the technical field of multi-directional input detection apparatus, and in particular to a multi-directional input detection apparatus.

BACKGROUND

The rocker multi-directional input detection apparatus generally includes a housing, an operating member that can be tilted on the housing, two rocker arms that rotate according to the tilting action of the operating member, two sliding terminals that are respectively connected to the two rocker arms, and a circuit board that detects the sliding amount of the two sliding terminals and outputs corresponding signals. The rocker multi-directional input detection apparatus can be used for game control to implement game controllers, arcades and other game control platforms, and control instructions can be triggered through the rocker.

The existing rocker multi-directional input detection apparatus cannot identify whether the user's hand is in contact with the rocker, and thus cannot have better interaction induction with the user, which is not perfected.

SUMMARY

The main purpose of the present application is to provide a multi-directional input detection apparatus, aiming to identify whether the user's hand is in contact with the rocker.

In order to achieve the above purpose, the multi-directional input detection apparatus provided in the present application includes:
  a seat;
  a housing is provided above the seat, the housing is provided with an inner cavity and an opening communicated with the inner cavity;
  a circuit board is provided between the housing and the seat, an induction pin is provided on a surface of the circuit board towards the opening;
  a rotating assembly is provided in the inner cavity; and
  a rocker assembly including a rod body and a conductor, one end of the rod body is slidably connected to the rotating assembly, and the other end of the rod body is configured to extend to an outside of the opening; one end of the conductor is connected to a part of the rod body outside the opening and is exposed on an outer surface of the rod body, and the other end of the conductor is configured to extend into the inner cavity and is electrically connected to the induction pin.

In an embodiment, the rocker assembly further includes a pin coaxially provided with the rod body; one end of the pin is electrically connected to the conductor, and the other end of the pin is electrically connected to the induction pin.

In an embodiment, the induction pin is provided at a middle of the circuit board, and the other end of the pin is abutted against the induction pin.

In an embodiment, the other end of the pin is abutted against the seat, and the seat is electrically connected to the induction pin.

In an embodiment, the multi-directional input detection apparatus further includes:
  an elastic member; and
  a gasket;
  the gasket is provided on a side surface of the rotating assembly towards the circuit board; one end of the elastic member is partially abutted against the seat and partially abutted against the induction pin, and the other end of the elastic member is abutted against the gasket; the other end of the pin is penetrated through the gasket and abutted against the seat.

In an embodiment, an installation groove is provided at one end of the rod body away from the opening, and one end of the pin is provided in the installation groove; a connection hole is opened on a peripheral side of one end of the rod body extending outside the opening, and the connection hole is communicated with the installation groove; one end of the conductor is connected to the rod body and exposed to the installation groove, and the other end of the conductor is penetrated through the connection hole and electrically connected to the pin.

In an embodiment, the rod body is provided with a plurality of connection holes spaced along a circumferential direction of the rod body; the conductor includes a connection body and a plurality of supporting feet connected to the connection body along the circumferential direction of the rod body; the connection body is provided in the installation groove and is electrically connected to the pin, and each of the supporting feet is correspondingly installed in each of the connection holes.

In an embodiment, the rocker assembly further includes a spring provided at a bottom of the installation groove; one end of the spring is abutted against and electrically connected to the conductor, and the other end of the spring is abutted against and electrically connected to the pin.

In an embodiment, an outer surface of the pin is in clearance fit with a sidewall of the installation groove, and an outer peripheral surface of the spring is in clearance fit with the sidewall of the installation groove.

In an embodiment, the pin includes an installation portion and two induction portions connected to both ends of the installation portion; a diameter of the installation portion is larger than a diameter of the induction portion, and the installation portion is provided in the installation groove; one of the induction portions is plugged into the spring, and one end of the installation portion away from the circuit board is abutted against the spring; one end of the other induction portion away from the installation portion is configured to extend out of the installation groove and is electrically connected to the induction pin.

In an embodiment, an end surface of the induction portion away from the installation portion is a spherical surface.

In the technical solution of the present application, the multi-directional input detection apparatus includes a seat, a housing, a circuit board, a rotating assembly and a rocker assembly. The housing is provided above the seat, and the housing is provided with an inner cavity and an opening communicated with the inner cavity. The circuit board is provided between the housing and the seat, and is provided below the inner cavity. The surface of the circuit board towards the opening is provided with an induction pin. The rocker assembly includes a rod body and a conductor. One end of the rod body is connected to the rotating assembly, and the other end of the rod body extends to the outside of the opening. One end of the conductor is connected to the part of the rod body provided outside the opening, and is exposed on the outer surface of the rod body; and the other end of the conductor extends into the inner cavity and is electrically connected to the induction pin. When the user's hand touches the rocker, the conductor is exposed on the outer surface of the rod body, and the hand induction contacts the conductor. Since the conductor extends into the inner cavity and is electrically connected to the induction pin, the induction pin is triggered, and the multi-directional input detection apparatus receives information that the user's hand touches the rocker, so that the display or interaction functions can be achieved.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that if there are directional indications, such as up, down, left, right, front, back, etc., involved in the embodiments of the present application, the directional indications are only used to explain a certain posture as shown in the accompanying drawings. If the specific posture changes, the directional indication also changes accordingly.

In addition, if there are descriptions related to "first", "second", etc. in the embodiments of the present application, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

The present application provides a multi-directional input detection apparatus 1.

In an embodiment of the present application, as shown in FIG. 1 to FIG. 6, the multi-directional input detection apparatus 1 includes a seat 10, a housing 60, a circuit board 20, a rotating assembly 30 and a rocker assembly 40. The housing 60 is provided above the seat 10, and the housing 60 is provided with an inner cavity 61 and an opening 63 communicated with the inner cavity 61. The circuit board 20 is provided between the housing 60 and the seat 10, and the surface of the circuit board 20 towards opening 63 is provided with an induction pin 21. The rotating assembly 30 is provided in the inner cavity 61. The rocker assembly 40 includes a rod body 41 and a conductor 43. One end of the rod body 41 is slidably connected to the rotating assembly 30, and the other end of the rod body 41 extends outside the opening 63. One end of the conductor 43 is connected to a part of the rod body 41 provided outside the opening 63, and is exposed on the outer surface of the rod body 41; and the other end of the conductor 43 extends into the inner cavity 61 and is electrically connected to the induction pin 21.

The multi-directional input detection apparatus 1 includes a seat 10, a housing 60, a circuit board 20, a rotating assembly 30 and a rocker assembly 40. The housing 60 is provided with an inner cavity 61 and an opening 63 communicated with the inner cavity 61. The circuit board 20 is provided between the housing 60 and the seat 10, and the surface of the circuit board 20 towards the opening 63 is provided with an induction pin 21. The rocker assembly 40 includes a rod body 41 and a conductor 43. One end of the rod body 41 is connected to the rotating assembly 30, and the other end of the rod body 41 extends outside the opening 63. One end of the conductor 43 is connected to the part of the rod body 41 outside the opening 63 and is exposed on the outer surface of the rod body 41; the other end of the conductor 43 extends into the inner cavity 61 and is electrically connected to the induction pin 21. Further, the housing 60 is made of plastic material, and the seat 10 is made of conductive material, such as stainless steel, iron, etc.

When the user's hand touches the rocker, since the conductor 43 is exposed on the outer surface of the rod body 41, the hand induction contacts the conductor 43. Since the conductor 43 extends into the inner cavity 61 and is electrically connected to the induction pin 21, the hand induction contacts the conductor 43. Since the conductor 43 is electrically connected to the induction pin 21, the induction conductor 43 is touched to trigger the induction pin 21, and the multi-directional input detection apparatus 1 receives the information that the user's hand touches the rocker, thereby enabling display or interaction functions. When the user's hand leaves the rocker, the conductor 43 loses induction and cannot trigger the induction pin 21, and the multi-directional input detection apparatus 1 receives the information that the user's hand leaves the rocker.

The material of the conductor 43 can be conductive rubber, conductive metal, etc. In an embodiment, when the conductor 43 is the conductive rubber. The conductive rubber is composed of glass silver-plated, aluminum silver-plated, silver and other conductive particles evenly distributed in silicone rubber, and the conductive particles are brought into contact through pressure to achieve good conductive properties. In other embodiments, when the conductor 43 is the conductive metal, the conductive metal may be stainless steel, iron, etc. Furthermore, the conductor 43 may be in a sheet shape, a strip shape, a block shape, etc., which is not limited here.

The multi-directional input detection apparatus 1 of the technical solution of the present application includes a seat 10, a housing 60, a circuit board 20, a rotating assembly 30 and a rocker assembly 40. The housing 60 is provided with an inner cavity 61 and an opening 63 communicated with the inner cavity 61. The circuit board 20 is provided between the housing 60 and the seat 10, and the surface of the circuit board 20 towards the opening 63 is provided with the induction pin 21. The rocker assembly 40 includes a rod body 41 and a conductor 43. One end of rod body 41 is connected to rotating assembly 30, and the other end of the rod body 41 extends to the outside of the opening 63. One end of the conductor 43 is connected to the part of the rod body 41 outside the opening 63 and is exposed on the outer surface of the rod body 41; the other end of the conductor 43 extends into the inner cavity 61 and is electrically connected to the induction pin 21. When the user's hand touches the rocker, since the conductor 43 is exposed on the outer surface of the rod body 41, the hand induction contacts the conductor 43. Since the conductor 43 extends into the inner cavity 61 and is electrically connected to the induction pin 21, the induction pin 21 is triggered, and the multi-directional input detection apparatus 1 receives information that the user's hand touches the rocker, so that the display or interaction function can be achieved.

Figure 1:
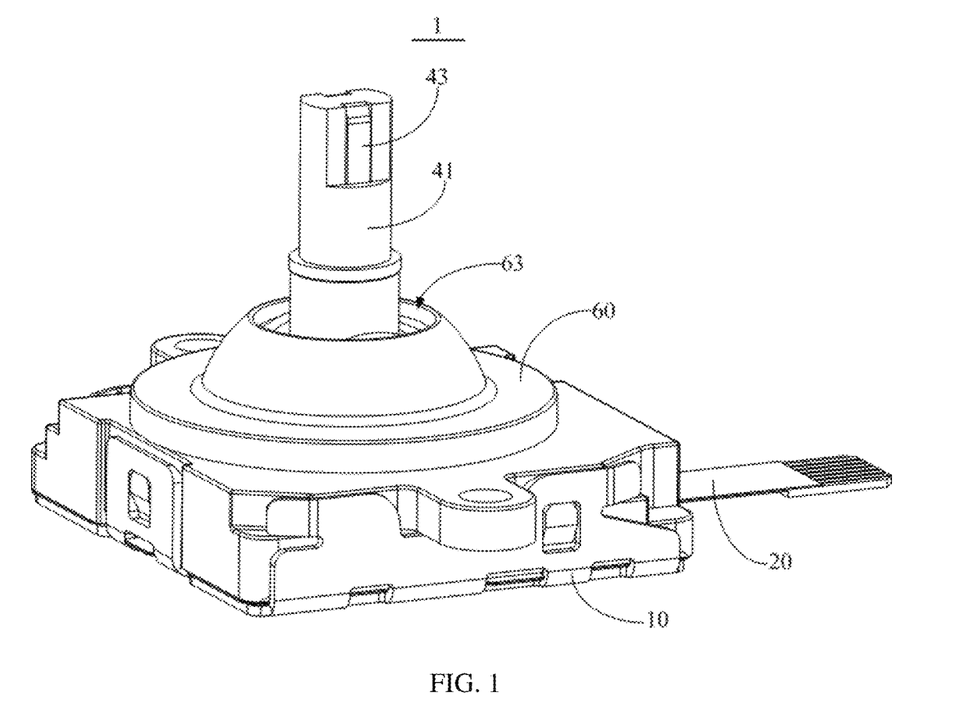
FIG. 1 is a schematic view of an appearance of a multi-directional input detection apparatus of the present application.
Figure 2:
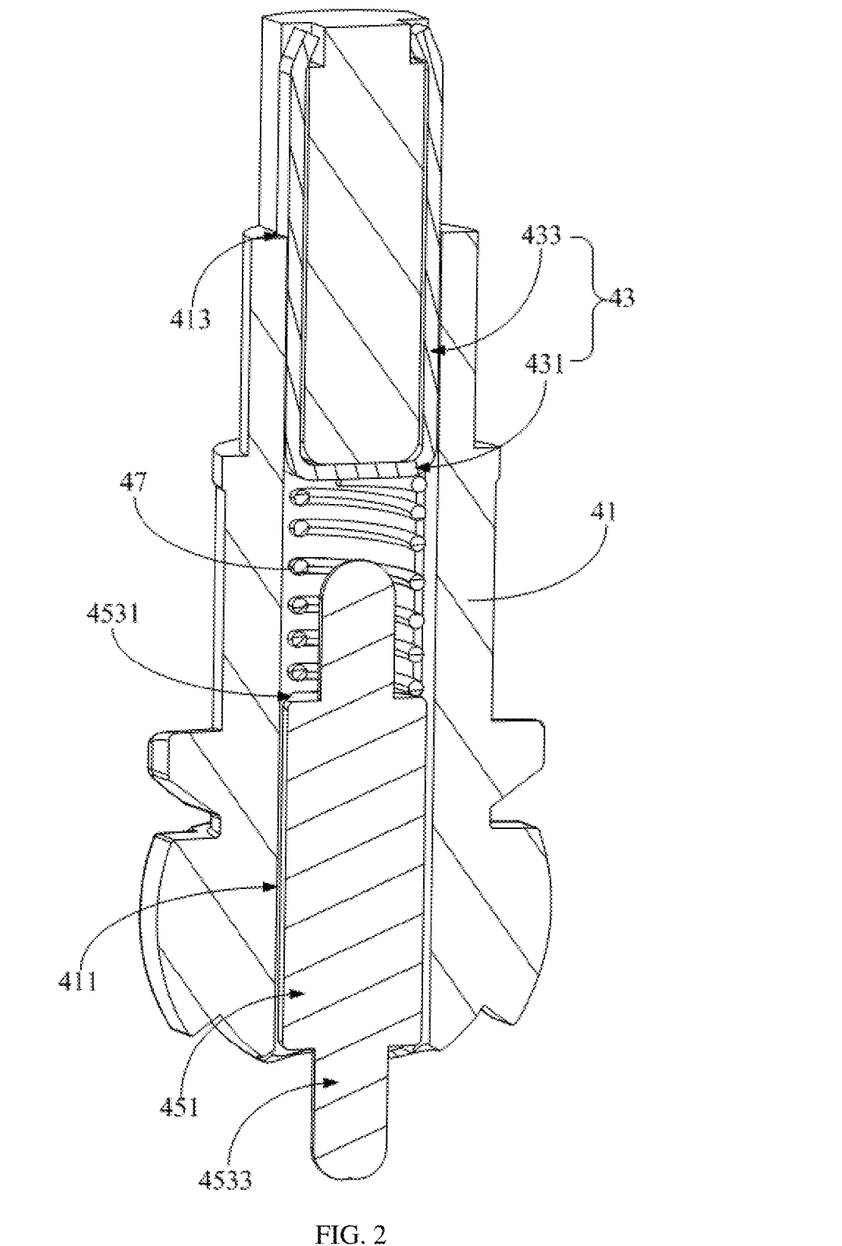
FIG. 2 is a schematic cross-sectional structural view of a rocker assembly in the multi-directional input detection apparatus of the present application.

In an embodiment of the present application, as shown in FIG. 2, the rocker assembly 40 also includes a pin 45 coaxially provided with the rod body 41. One end of the pin 45 is electrically connected to the conductor 43, and the other end of the pin 415 is electrically connected to the induction pin 21.

The pin 45 is connected between the rod body 41 and the circuit board 20. On the one hand, the rod body 41 can support the rod body 41, and on the other hand, the rod body 41 has the function of conduction and is configured to electrically connect the induction pin 21 of the circuit board 20 and the rod body 41.

Figure 4:
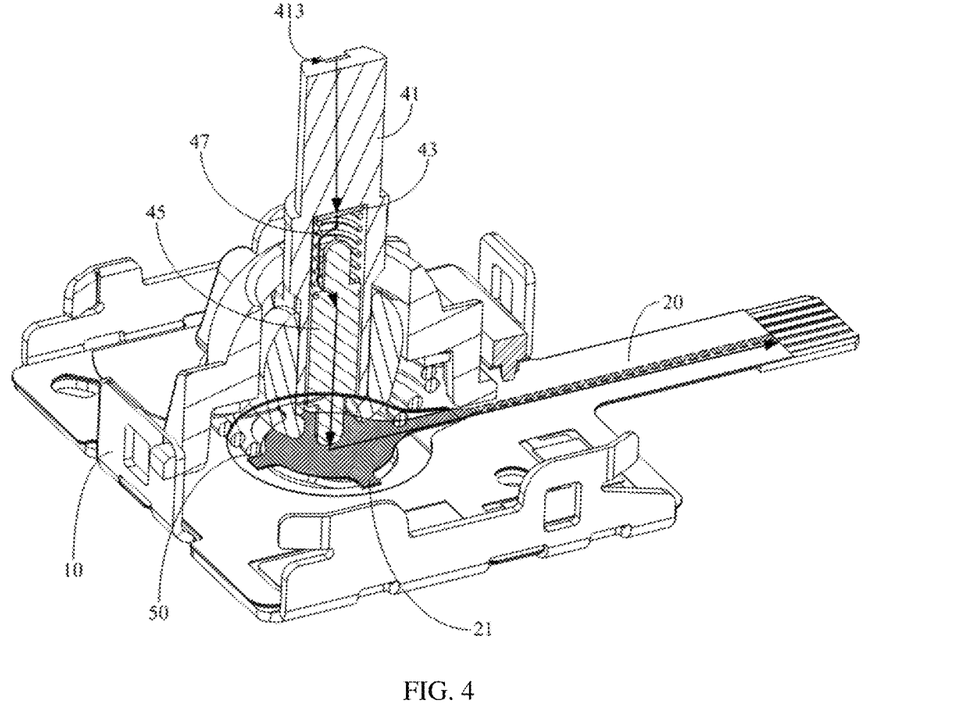
FIG. 4 is a schematic view of an induction circuit of the multi-directional input detection apparatus according to an embodiment of the present application.
Figure 6:
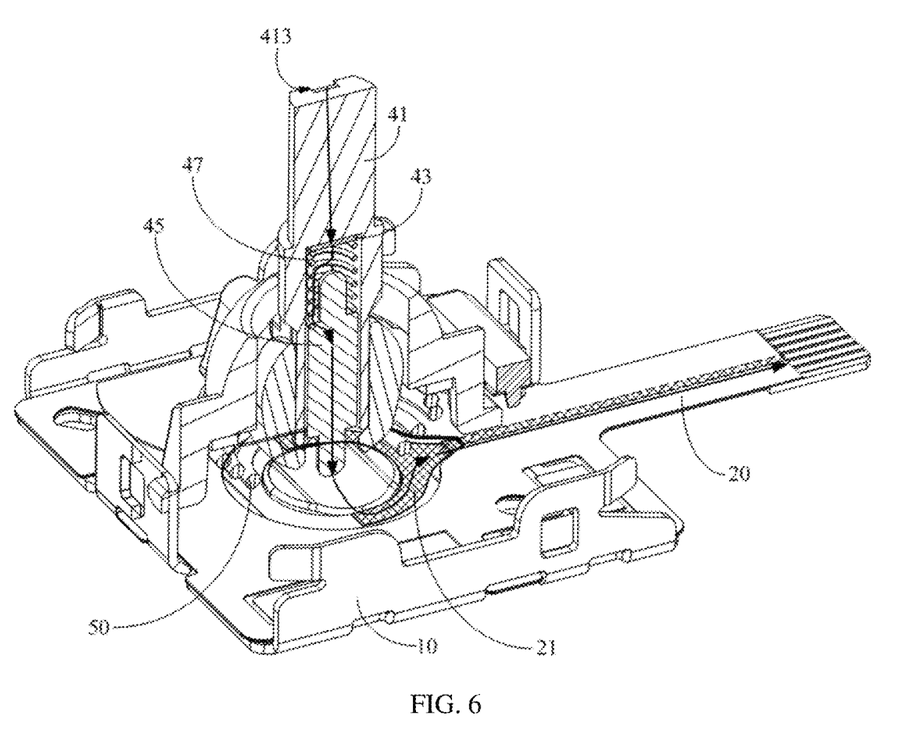
FIG. 6 is a schematic view of an induction circuit of the multi-directional input detection apparatus according to an embodiment of the present application.

In an embodiment of the present application, as shown in FIG. 4, the induction pin 21 is provided at a middle of the circuit board 20, and the other end of the pin 45 is abutted against the induction pin 21; or, as shown in FIG. 6, the other end of the pin 45 is abutted against the seat 10, and the seat 10 is electrically connected to the induction pin 21.

Figure 3:
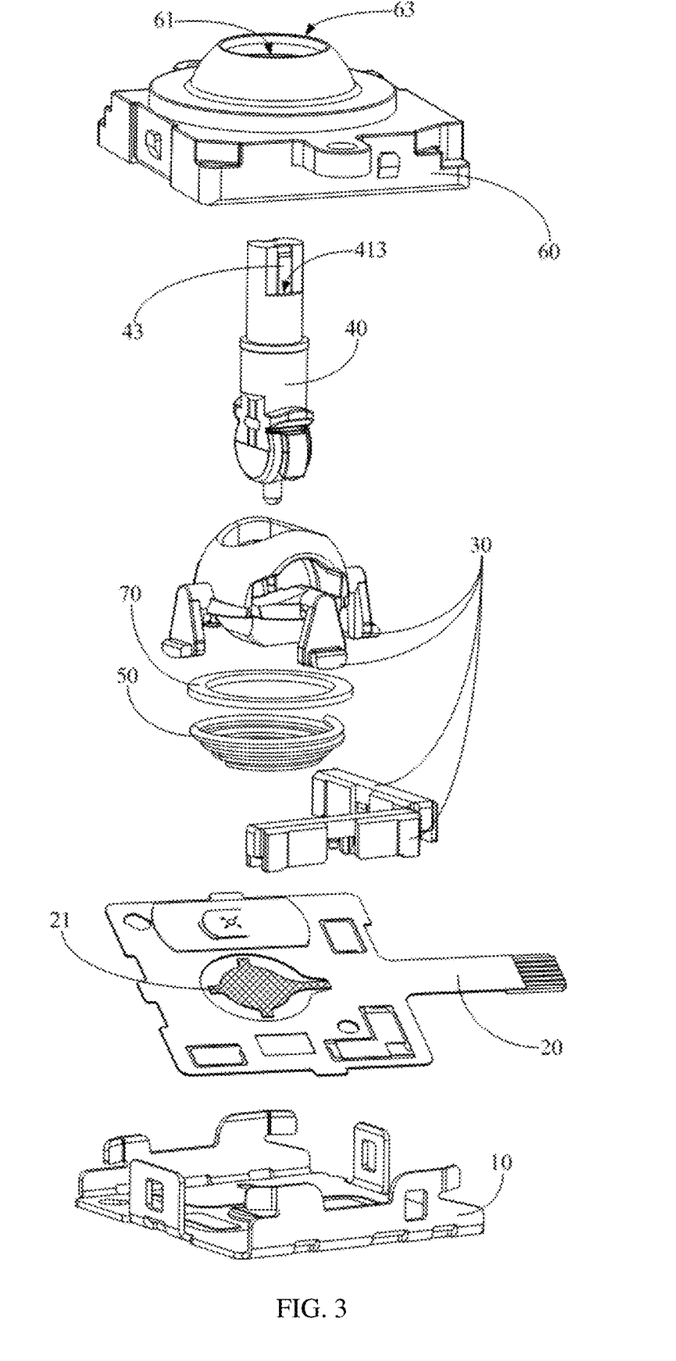
FIG. 3 is a schematic exploded structural view of the multi-directional input detection apparatus according to an embodiment of the present application.

In an embodiment, as shown in FIG. 3 and FIG. 4, the induction pin 21 is provided at the middle of the circuit board 20, and the other end of the pin 45 is abutted against the induction pin 21. In this way, the position of pin 45 contacting the circuit board 20 is corresponding to the position of the induction pin 21. The signal induction path is from the conductor 43 to the pin 45 and then to the induction pin 21, which is the shortest, saves materials and has the lowest cost.

In an embodiment, as shown in FIG. 6, the other end of the pin 45 is abutted against the seat 10, and the seat 10 is electrically connected to the induction pin 21. In this way, the circuit board 20 is provided with an avoiding hole at the position corresponding to the pin 45, and the part of the seat 10 corresponding to the avoiding hole is provided with a protrusion. When the seat 10 is combined with the circuit board 20, the protrusion is inserted into the avoiding hole. Since the housing 20 is a conductor, and the induction pin 21 on the circuit board 20 is electrically connected to the housing, which can realize signal communication transmission. Therefore, the end of pin 45 contacts the protrusion part of seat 10, and the signal induction path flows from the conductor 43 to the pin 45, then to the seat 10, and finally to the induction pin 21, which has the characteristics of high stability and maintains effectiveness and stability of signal triggering.

In an embodiment of the present application, as shown in FIG. 3 to FIG. 6, the multi-directional input detection apparatus 1 also includes an elastic member 50 and a gasket 70. The gasket 70 is provided on one side surface of the rotating assembly 30 towards the circuit board 20. One end of the elastic member 50 is partially abutted against the seat 10 and is partially abutted against the induction pin 21; the other end of the elastic member 50 is abutted against the gasket 70; and the other end of the pin 45 is penetrated through gasket 70 and abutted against the seat 10.

Figure 5:
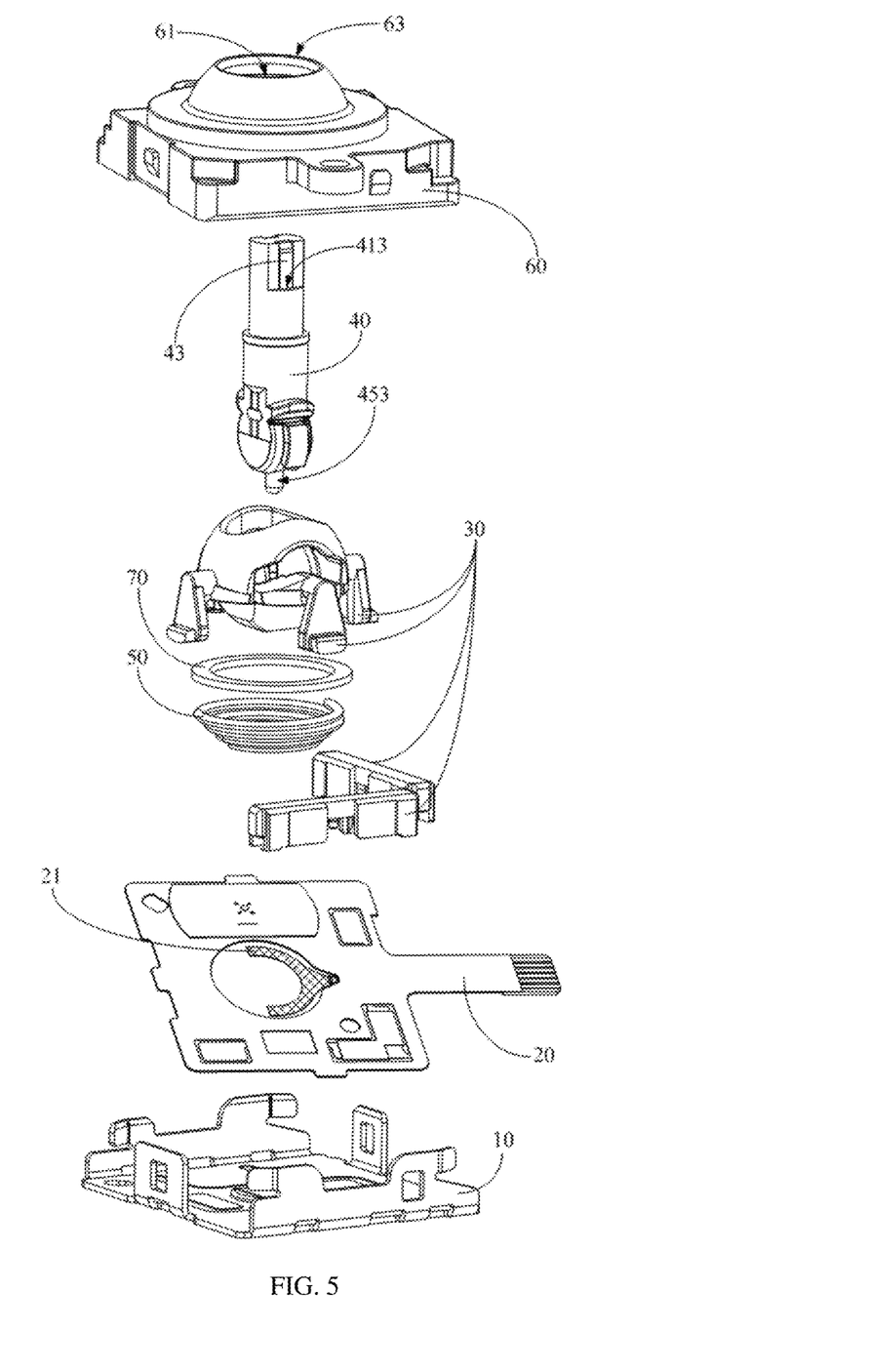
FIG. 5 is a schematic exploded structural view of the multi-directional input detection apparatus according to an embodiment of the present application.

The elastic member 50 is provided between the rotating assembly 30 and the circuit board 20, and is configured to support and reset the rotating assembly 30; on the other hand, the elastic member 50 can also press the induction pin 21 so that the induction pin 21 is in contact with the seat 10 more fully. In an embodiment, as shown in FIG. 5 and FIG. 6, the induction pin 21 is a double-sided conductive copper wire, and the location where the pin 45 contacts the circuit board 20 is not provided with the induction pin 21. The signal induction path is from the conductor 43 to the pin 45, then to the seat 10. The induction flows to the induction pin 21 through the part of the seat 10 that is in contact with the induction pin 21, which does not require the pin 45 to directly contact the induction pin 21, avoids the wear of the induction pin 21 resulting from long-term contact and movement, and protects the induction pin 21 and improves the service life.

In an embodiment of the present application, as shown in FIG. 2, an installation groove 411 is opened at one end of the rod body 41 away from the opening 63, and one end of the pin 45 is provided in the installation groove 411. A connection hole 413 is opened on the peripheral side of one end of the rod body 41 extending to the outside of the opening 63, and the connection hole 413 is communicated with the installation groove 411. One end of the conductor 43 is connected to the rod body 41 and is exposed in the installation groove 411, and the other end of the conductor 43 is passed through the connection hole 413 and is electrically connected to the pin 45.

The installation groove 411 is provided at the end of the rod body 41 away from the opening 63. One end of the pin 45 is provided in the installation groove 411. The connection hole 413 is provided at the peripheral side of the end of the rod body 41 extending to the outside of the opening 63, and the connection hole 413 is communicated with the installation groove 411. One end of the conductor 43 is connected to the rod body 41 and is exposed in the installation groove 411, and the other end of the conductor 43 is inserted into the connection hole 413 and electrically connected to the pin 45. In this way, the pin 45 is installed in the installation groove 411, which limits the moving position of the pin 45 and ensures the synchronization movement with the rod body 41. The conductor 43 is communicated with the installation groove 411 through the connection hole 413 and is abutted against the pin 45, so that part of the conductor 43 is exposed outside the rod body 41 and part of the conductor 43 is electrically connected to the pin 45.

In an embodiment of the present application, as shown in FIG. 2, the rod body 41 is provided with a plurality of connection holes 413 spaced apart along the circumferential direction of the rod body 41. The conductor 43 includes a connection body 431 and a plurality of supporting feet 433 connected to the connection body 431 along the circumferential direction. The connection body 431 is provided in the installation groove 411 and is electrically connected to the pin 45. Each of the supporting feet 433 is correspondingly installed in one connection hole 413.

The plurality of connection holes 413 are provided, and the conductor 43 is divided into the connection body 431 and the plurality of supporting feet 433 separately provided on the peripheral side of the rod body 41, so that the conductor 43 can be provided in different directions outside the rod body 41, and the induction of the plurality of supporting feet 433 is synchronized, achieving the effect of wide induction and timely induction.

In an embodiment of the present application, as shown in FIG. 2, the rocker assembly 40 also includes a spring 47 provided at the bottom of the installation groove 411, and the two ends of the spring 47 are abutted against and are electrically connected to the conductor 43 and the pin 45 respectively.

The spring 47 is provided at the bottom of the groove provided in the installation groove 411, and the two ends of the spring 47 are abutted against and are electrically connected to the conductor 43 and the pin 45 respectively. In this way, the spring 47 can support and abut to reset the pin 45, which maintains the relative position of the pin 45 and the rod body 41, maintains the relative position of the pin 45 inside the inner cavity 61, and improves the movement stability of the pin 45 and the rod body 41.

In an embodiment of the present application, as shown in FIG. 2, the outer surface of the pin 45 is in clearance fit with the sidewall of the installation groove 411; or the outer peripheral surface of the spring 47 is in clearance fit with the groove sidewall of the installation groove 411.

The outer surface of the pin 45 is in clearance fit with the sidewall of the installation groove 411, which ensures that the pin 45 can move within the installation groove 411 inside the rod body 41, that is, the pin 45 is provided inside the inner cavity 61 and moves relative to the rod body 41, which maintains the relative position of the pin 45 and the rod body 41, and the pin 45 is driven to move by the rod body 41.

The outer peripheral surface of the spring 47 is in clearance fit with the groove sidewall of the installation groove 411, which maintains that the pin 45 and the spring 46 can move within the installation groove 411 inside the rod body 41. The spring 47 is provided inside the installation groove 411 and has elasticity for the pin 45, that is, no matter which direction the pin 45 tilts and rotates relative to the rod body, the spring 47 can keep the pin 45 provided inside the inner cavity 61 and electrically connected to the induction pin 21, so that the pin 45 is driven to move by the rod body 41 and the relative position remains unchanged after reset.

In an embodiment of the present application, as shown in FIG. 2 to FIG. 6, the pin 45 includes an installation portion 451 and two induction portions 453 connected to both ends of the installation portion 451. The diameter of the installation portion 451 is larger than the diameter of the induction portion 453, and the installation portion 451 is provided in the installation groove 411. One induction portion 453 is plugged into the spring 47, and one end of the installation portion 451 away from the circuit board 20 is abutted against the spring 47; one end of the other induction portion 453 away from the installation portion 451 extends out of the installation groove 411 and is electrically connected to the circuit board 20.

The pin 45 includes an installation portion 451 and two induction portions 453 connected to both ends of the installation portion 451. In this embodiment, the induction portion 453 abutted against the spring 47 is the first induction portion 4531, and the induction portion 453 electrically connected to the circuit board 20 is the second induction portion 4533. The diameter of the installation portion 451 is larger than the diameter of the induction portion 453. The installation portion 451 is provided in the installation groove 411. The first induction portion 4531 is plugged into the spring 47. One end of the installation portion 451 away from the circuit board 20 is abutted against the spring 47. One end of the second induction portion 4533 away from the installation portion 451 extends out of the installation groove 411 and is electrically connected to the circuit board 20. In this way, the abutting stability of the pin 45, the rod body 41, and the circuit board 20 is maintained, the relative position of the pin 45 inside the inner cavity 61 is maintained, and the movement stability of the pin 45 and the rod body 41 is improved.

In an embodiment of the present application, as shown in FIG. 2 to FIG. 6, an end surface of the induction portion 453 away from the installation portion 451 is a spherical surface.

The end surface of the induction portion 453 away from the installation portion 451 is a spherical surface. In this way, the induction portion 453 of the spherical surface facilitates the smoothness of the pin 45 when connected to the circuit board 20 or the induction pin 21, and also maintains the smoothness of the pin 45 when moving and turning, improving the movement stability of the pin 45 and the rod body 41.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields are included in the scope of the present application.

What is claimed is:

1. A multi-directional input detection apparatus, comprising:
   a seat;
   a housing provided above the seat, wherein the housing is provided with an inner cavity and an opening communicated with the inner cavity;
   a circuit board provided between the housing and the seat, wherein an induction pin is provided on a surface of the circuit board towards the opening;
   a rotating assembly provided in the inner cavity; and
   a rocker assembly comprising a rod body and a conductor, wherein one end of the rod body is slidably connected to the rotating assembly, and the other end of the rod body is configured to extend to an outside of the opening; one end of the conductor is connected to a part of the rod body outside the opening and is exposed on an outer surface of the rod body, and the other end of the conductor is configured to extend into the inner cavity and is electrically connected to the induction pin;
   wherein the rocker assembly further comprises a pin coaxially provided with the rod body; one end of the pin is electrically connected to the conductor, and the other end of the pin is electrically connected to the induction pin.

2. The multi-directional input detection apparatus according to claim 1, wherein the induction pin is provided at a middle of the circuit board, and the other end of the pin is abutted against the induction pin.

3. The multi-directional input detection apparatus according to claim 1, wherein the other end of the pin is abutted against the seat, and the seat is electrically connected to the induction pin.

4. The multi-directional input detection apparatus according to claim 1, further comprising:
an elastic member; and
a gasket;
wherein the gasket is provided on a side surface of the rotating assembly towards the circuit board; one end of the elastic member is partially abutted against the seat and partially abutted against the induction pin, and the other end of the elastic member is abutted against the gasket;
the other end of the pin is penetrated through the gasket and abutted against the seat.

5. The multi-directional input detection apparatus according to claim 1, wherein an installation groove is provided at one end of the rod body away from the opening, and one end of the pin is provided in the installation groove; a connection hole is opened on a peripheral side of one end of the rod body extending outside the opening, and the connection hole is communicated with the installation groove; one end of the conductor is connected to the rod body and exposed to the installation groove, and the other end of the conductor is penetrated through the connection hole and electrically connected to the pin.

6. The multi-directional input detection apparatus according to claim 5, wherein the rod body is provided with a plurality of connection holes spaced along a circumferential direction of the rod body; the conductor comprises a connection body and a plurality of supporting feet connected to the connection body along the circumferential direction of the rod body; the connection body is provided in the installation groove and is electrically connected to the pin, and each of the supporting feet is correspondingly installed in each of the connection holes.

7. The multi-directional input detection apparatus according to claim 6, wherein the rocker assembly further comprises a spring provided at a bottom of the installation groove; one end of the spring is abutted against and electrically connected to the conductor, and the other end of the spring is abutted against and electrically connected to the pin.

8. The multi-directional input detection apparatus according to claim 7, wherein an outer surface of the pin is in clearance fit with a sidewall of the installation groove, and an outer peripheral surface of the spring is in clearance fit with the sidewall of the installation groove.

9. The multi-directional input detection apparatus according to claim 8, wherein the pin comprises an installation portion and two induction portions connected to both ends of the installation portion; a diameter of the installation portion is larger than a diameter of the induction portion, and the installation portion is provided in the installation groove; one of the induction portions is plugged into the spring, and one end of the installation portion away from the circuit board is abutted against the spring; one end of the other induction portion away from the installation portion is configured to extend out of the installation groove and is electrically connected to the induction pin.

10. The multi-directional input detection apparatus according to claim 9, wherein an end surface of the induction portion away from the installation portion is a spherical surface.

* * * * *